United States Patent
Kamijo (10) Patent No.: US 8,867,887 B2
(45) Date of Patent: Oct. 21, 2014

(54) MULTIMEDIA DATA RECORDING/REPRODUCING DEVICE

(75) Inventor: Yoshio Kamijo, Matsumoto (JP)

(73) Assignee: Roland Corporation, Hamamatsu (JP)

( * ) Notice: Subject to any disclaimer, the term of this patent is extended or adjusted under 35 U.S.C. 154(b) by 362 days.

(21) Appl. No.: 13/424,298

(22) Filed: Mar. 19, 2012

(65) Prior Publication Data

US 2012/0243546 A1      Sep. 27, 2012

(30) Foreign Application Priority Data

Mar. 25, 2011   (JP) .................................. 2011-067337

(51) Int. Cl.
*H04N 5/77*      (2006.01)
*H04L 29/06*    (2006.01)

(52) U.S. Cl.
CPC .................................. *H04L 65/605* (2013.01)
USPC ........... 386/224; 386/200; 386/201; 386/202; 386/203; 386/338; 386/339; 386/340

(58) Field of Classification Search
CPC ................................ H04L 45/00; H04L 29/04
USPC ................... 386/200–203, 338–340
See application file for complete search history.

(56) References Cited

U.S. PATENT DOCUMENTS

| | | | |
|---|---|---|---|
| 5,594,551 A * | 1/1997 | Monta | 386/328 |
| 6,370,199 B1 * | 4/2002 | Bock et al. | 375/240.28 |
| 6,614,984 B2 * | 9/2003 | Rigatti | 386/232 |
| 8,631,141 B2 * | 1/2014 | Gruber et al. | 709/230 |
| 8,744,232 B2 * | 6/2014 | Lee | 386/224 |
| 8,768,141 B2 * | 7/2014 | Chan | 386/224 |
| 8,787,726 B2 * | 7/2014 | Rossi | 386/224 |
| 2008/0151925 A1 | 6/2008 | Saito et al. | |
| 2008/0310461 A1 | 12/2008 | Bader et al. | |

OTHER PUBLICATIONS

Catalog: "RSS by Roland: Professional Audio Equipment, Spring 2010, REAC Products", Apr. 2010, 6 pages.

* cited by examiner

*Primary Examiner* — Helen Shibru
(74) *Attorney, Agent, or Firm* — Foley & Lardner LLP (57) ABSTRACT

An audio data capturing device captures packetized multimedia data transmitted through a transmission path from a stage unit, and converts the packetized multimedia data to original audio data. A storage section stores the data. An audio data delivery section packetizes audio data stored in the storage section and transmits it to the mixer through the transmission path. A path switching control section performs switching-control among the stage unit, the mixer, the audio data capturing section and the audio data delivery section.

17 Claims, 5 Drawing Sheets

MULTIMEDIA DATA RECORDING/REPRODUCING DEVICE

CROSS-REFERENCE TO RELATED PATENT APPLICATIONS

Japan Priority Application No. 2011-067337, filed Mar. 25, 2011, including the specification, drawings, claims and abstract, is incorporated herein by reference in its entirety.

FIELD OF THE INVENTION

Embodiments of the invention relate to devices and processes for recording and reproducing packetized multimedia data that can be transmitted through a transmission path among devices having transmission and reception functions.

BACKGROUND

A system for packetizing multimedia data and transmitting the multimedia data among devices that have transmission and reception functions can be used for transmitting multiple sound signals, where the sound signals are picked up, for example, on a stage of a concert hall or the like, and transmitted to a control booth that is located separated from the stage. For example, a stage unit device having transmission and reception functions may be disposed on the side of the stage. Sound signals from multiple musical instruments or microphones connected to the stage unit may be packetized and transmitted through a transmission path to a mixer device in a device that has transmission and reception functions at the control booth. The signals are converted to sound signals and mixed by the mixer. Thereafter, the sound signals may be packetized again and supplied through the transmission path to the stage unit on the side of the stage, converted to sound signals, and supplied to speakers or monitor devices.

According to the technology described above, multiple channel signals outputted from the mixer may be recorded on a recording/reproducing device, and thereafter the recorded signals may be reproduced as multiple channel signals and transmitted to the mixer or the stage unit. Recording at the recording/reproducing device is conducted by inputting multichannel output signals that are outputted from the mixer into the recording/reproducing device. Reproduction from the recording/reproducing device is conducted by inputting multichannel output signals that are outputted from the recording/reproducing device into respective channels of the mixer. In typical conventional systems, ordinary digital signals, not packetized data, are communicated between inputs and outputs of the devices.

According to conventional configurations, when transmitting multichannel output signals from the recording/reproducing device to the mixer or the stage unit, the connection for taking signals from the stage unit into the mixer must be modified to a connection for taking multichannel output signals from the recording/reproducing device and connecting the signals into respective channels of the mixer. However, such a modification can be complicated and may result in connection errors. As a result, it is possible that multichannel signals from the mixer may not be recorded on the recording/reproducing device, and recorded multiple channel signals may not be outputted to the stage unit.

SUMMARY OF THE DISCLOSURE

Embodiments of the present invention provide a multimedia data recording/reproducing device which avoids certain types of connection errors.

A multimedia data recording/reproducing device in accordance with an embodiment of the invention is connected with devices having transmission and reception functions on a transmission path through which packet multimedia data is communicated. Packet multimedia data is packetized multimedia data containing one or both of digital sound and picture data. The multimedia data recording/reproducing device includes a capturing device. The capturing device captures the packet multimedia data, converts the packet multimedia data to the multimedia data and outputs the same. A storage device stores and reads the multimedia data outputted from the capturing device, and outputs the multimedia data. A delivery device packetizes the multimedia data outputted from the storage device and transmits the same to the transmission path. A switching control device controls the connection state among the devices having transmission and reception functions connected to the transmission path, the capturing device and the delivery device.

A multimedia data recording/reproducing device as described above may be configured for bidirectional transmission of packet multimedia data when capturing packet multimedia data and when delivering packet multimedia data. The switching control device controllably switches the connection state among the devices having transmission and reception functions, the capturing device and the delivering device, such that there is no need to change the connection. Therefore, connection modification errors can be avoided.

The device having transmission and reception functions may include a first device having transmission and reception functions and a second device having transmission and reception functions, each connected to respective sections of the transmission path. In a first mode, the switching control device performs a control such that the first device and the second device are not connected with each other, but the delivering device and the second device are connected to each other. In a second mode, the switching control device performs a control such that the first device and the second device are connected with each other, and the first device and the capturing device are connected to each other.

According to such a configuration, in the first mode, packet multimedia data from the delivering device is supplied to the second device without connecting the first device and the second device with each other, such that the second device can process the packet multimedia data from the delivering device of the multimedia data recording and reproducing device as if they were supplied from the first device. In the second mode, packet multimedia data from the first device is supplied to the second device, and the packet multimedia data from the first device is supplied to the capturing device of the multimedia data recording/reproducing device, such that multimedia data based on the packet multimedia data from the first device can be stored in the storage device of the multimedia data recording/reproducing device.

The multimedia data may be composed of multiple channels. In this case, the storage device may store multimedia data of selected channels (one or more of the multiple channels). Selection of the multiple channels may be performed by using, for example, an input patch bay. When multimedia data is composed of multiple channels in a manner described above, only desired channels among the multiple channels may be selected and recorded.

In embodiments where the multimedia data is composed of multiple channels, a monitoring device may be provided for outputting multimedia data of selected channels for monitoring. The selected channels are selected from among multimedia data outputted from the capturing device and multimedia data outputted from the storage device.

In a monitoring device as described above, multimedia data that is not actually recorded but inputted in the recording/reproducing device can be monitored, and multimedia data of selected channels among the multimedia data outputted from the storage device can be monitored.

The packet multimedia data may include packetized control data for controlling the storage device. In this case, a control data capturing device takes in the packet multimedia data, converts the packet control data to the control data and outputs the same. A recording and reproducing control device controls the storage device based on the control data outputted from the control data capturing device.

According to embodiments as described above, the state of storing multimedia data in the storage device and the state of outputting multimedia data from the storage device can be controlled, externally. Also, when the multimedia data is composed of multiple channels, the storage device stores multimedia data of channels selected by the recording and reproducing control device.

When the multimedia data is composed of multiple channels, then among multimedia data outputted from the capturing device and multimedia data outputted from the storage device, the monitoring device outputs multimedia data of channels selected by the recording and reproducing control device for monitoring.

As described above, according to embodiments of the invention, the connections need not be changed, and recording failures and reproduction failures due to connection errors can be avoided.

DETAILED DESCRIPTION

Figure 1:
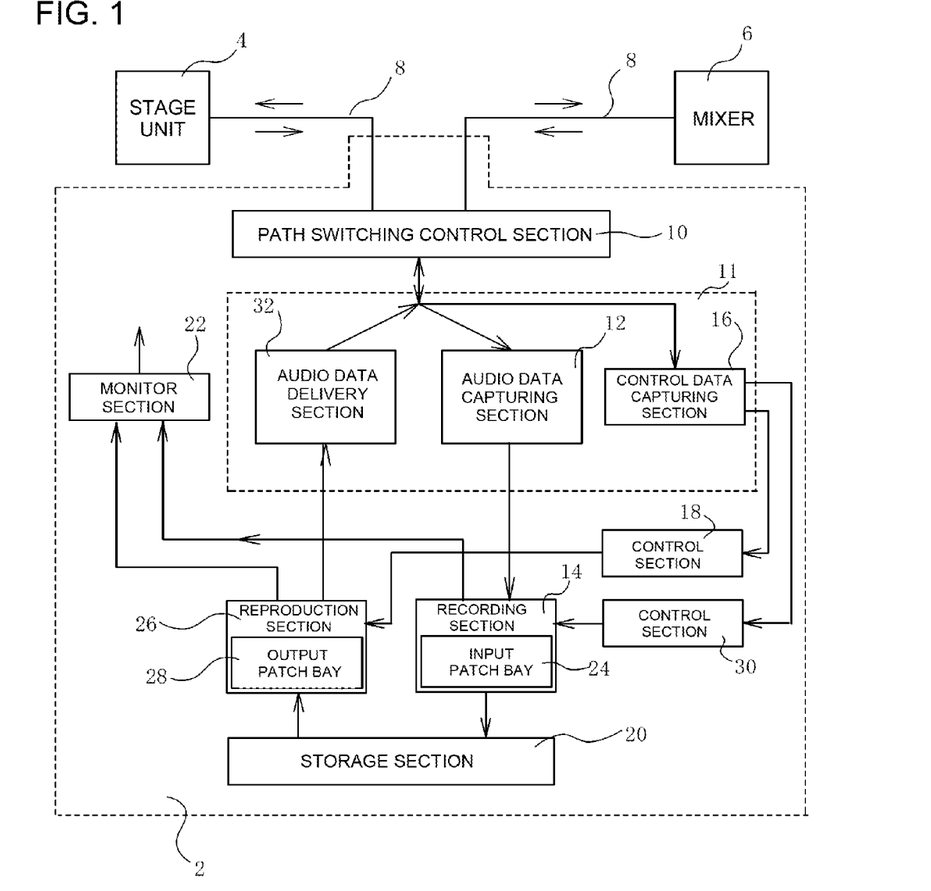
FIG. 1 is a functional block diagram of a multimedia data recording/reproducing device in accordance with an embodiment of the invention.

A multimedia data recording/reproducing device 2 in accordance with an embodiment of the invention is configured to be used with other devices having transmission and reception functions, for example, a stage unit 4 and a mixer 6, as shown in FIG. 1. The stage unit 4 may be placed, for example, at a stage of a concert hall. The stage unit 4 packetizes digitized audio data of performance sounds of electronic musical instruments, singing voices and the like on the stage, in different channels, and transmits the packet signals through a transmission path 8. The mixer 6 converts the signals transmitted through the transmission path 8 to the original audio data, renders mixing processings on the data, and transmits packet signals of the mixing-processed data through the transmission path 8. The stage unit 4 converts the packet signals to the original mixing-processed data, changes the data into analog signals and supplies the same to speakers on the stage, or to a monitor device on the stage. The transmission paths may include, for example, LAN cables or the like.

The multimedia data recording/reproducing device 2 is connected in the transmission path 8, between the storage unit 4 and the mixer 6. The multimedia data recording/reproducing device 2 may be disposed, for example, near the mixer 6, and captures packet signals from the stage unit 4 or packet signals from the mixer 6, converts packetized multichannel output data or packetized mixing-processed data to original audio data and stores the same. Also, the multimedia data recording/reproducing device 2 converts the stored multichannel output data or mixing-processed data to packet signals, and transmits the same to one or both of the stage unit 4 and the mixer 6. Accordingly, the multimedia data recording/reproducing device 2, the stage unit 4 and the mixer 6 are capable of bidirectional communications through the transmission path 8, such that it is not necessary to change the wiring connections at the multimedia data recording/reproducing device 2 at the time of recording and reproducing.

Packet signals are transmitted from the stage unit 4 to the multimedia data recording/reproducing device 2. The multimedia data recording/reproducing device 2 includes a switching control device, such as, for example, a path switching control section 10. The packet signals supplied from the stage unit 4 through the path switching control section 10 are converted to original audio data by a capturing device corresponding to the type of data, such as, for example, an audio data capturing section 12. A capturing device is configured for each type of data, and these devices form a packet processing section 11. When original audio data is composed of multiple audio channels, the signals are converted to audio data with the same number of multiple audio channels as that of the original audio data. The resulting audio data is supplied to a recording section 14. Also, control data included in packet signals is captured by a control data capturing device of the packet processing section 11, such as, for example, a control data capturing section 16. When the control data is an instruction to record corresponding packet audio data, a control section 18 of the multimedia data recording/reproducing device 2, instructs the recording section 14 according to the control data, to store audio data converted from the corresponding packet signals in a storage device, such as, for example, a storage section 20. The storage section 20 may include any suitable electronic data storage device such as, but not limited to, a hard disk, a USB memory or the like. When another type of data, for example, video signal data is concurrently transmitted, the data may be similarly processed by an independent capturing device (not shown) of the packet processing section 11, and stored in the storage section 20.

Multichannel output data or mixing-processed data outputted from the audio data capturing section 12 is supplied to a monitoring device, such as, for example, a monitor section 22. Accordingly, by monitoring with the monitor section 22, a determination can be made as to which audio channels of the audio data are to be stored.

The recording section 14 includes an input patch bay 24 similar to a conventional mixer. The input patch bay 24 is used to determine which audio channels of audio data restored by the packet processing section 11 are to be allocated to which input channels. The allocation operation at the input patch bay 24 may be manually performed by the user of the multimedia data recording/reproducing device 2, or may be controlled by control data transmitted in packets from the mixer 6. The description above relates to a case where recording audio data is sent from the stage unit 4. However, mixing-processed data from the mixer 6 may be recorded in the storage section 20 in a similar manner.

Next, an example of a reproduction operation by the multimedia data recording/reproducing device 2 is described. In particular, audio data of multiple channels stored in the storage section 20 is supplied to a reproduction section 26. An output patch bay 28 of the reproduction section 26 allocates the audio data to selected output channels, and outputs the same. Outputs from the reproduction section 26 can be monitored by the monitor section 22. The allocation operation by the output patch bay 28 may be manually performed, or may be performed by a control section 30 of the multimedia data recording/reproducing device 2, based on packet control data from the mixer 6 captured by the control data capturing section 16. Also, audio channels to be reproduced by the reproduction section 26 may be selected in a similar manner by control data transmitted from the mixer.

Audio data reproduced by the reproduction section 26 are supplied to a delivery device, such as, for example, an audio data delivery section 32, packetized therein, and transmitted to the stage unit 4 and the mixer 6 through the path switching control section 10 via the transmission path 8. The reproduction operation is performed by the multimedia data recording/reproducing device 2, in a manner as described above.

Figure 2:
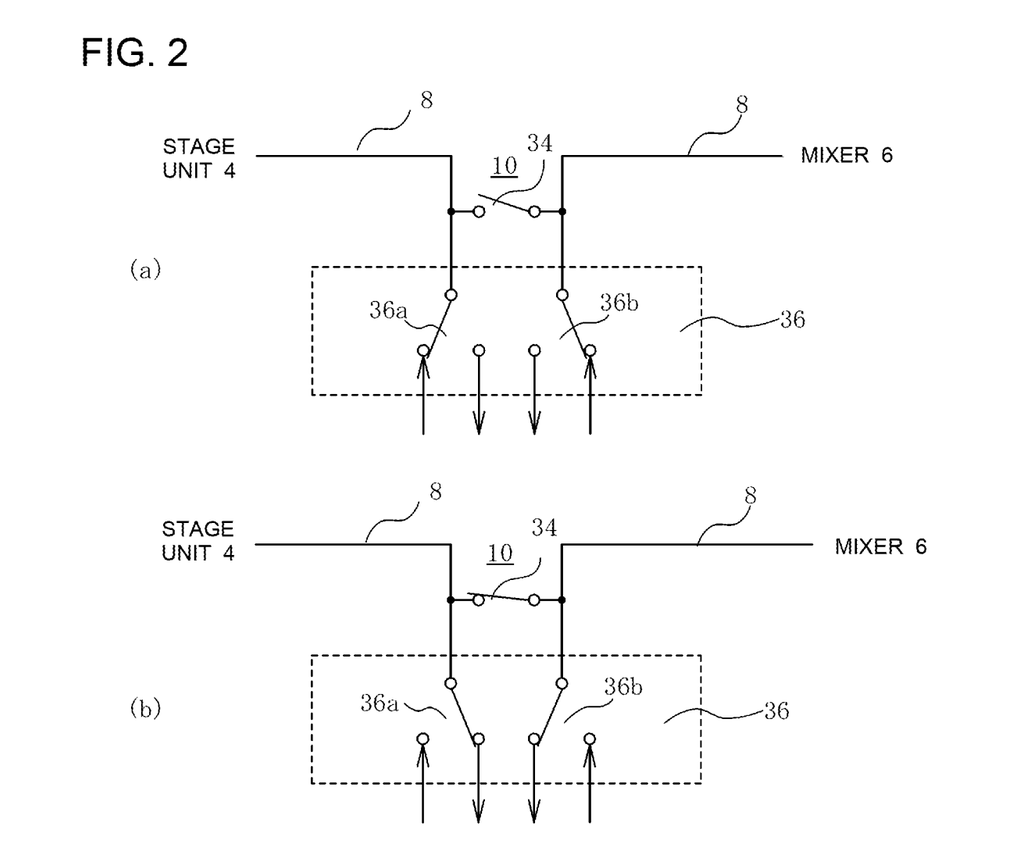
FIG. 2a and FIG. 2b show the connection state of the path switching control section of the multimedia data recording/reproducing device shown in FIG. 1.

The path switching control section 10 functionally connects between the section of the transmission path 8 that connects the stage unit 4 with the multimedia data recording/reproducing device 2 and the section of the transmission path 8 that connects the multimedia data recording/reproducing device 2 with the mixer 6 by an open/close switch 34 that is capable of conducting packet signals, in the second mode, as shown in FIG. 2 (*b*). In the second mode, the open/close switch 34 is closed, and packet signals from the stage unit 4 are supplied to the multimedia data recording/reproducing device 2, and also transmitted to the mixer 6. Also, packet signals from the mixer 6 are supplied to the multimedia data recording/reproducing device 2, and also transmitted to the stage unit 4. Further, packet signals from the stage unit 4 are supplied to the packet processing section 11 through a switch 36*a* on the stage unit 4 side of the path switching section 36 of the path switching control section 10. The packet signals supplied to the packet processing section 11 are converted to data by a capturing device corresponding to the type of data, such as, for example, the audio data capturing section 12. Accordingly, for example, the mixer 6 can perform mixing of a live performance and, at the same time, the multimedia data recording/reproducing device 2 can record the live performance in multiple channels. Similarly, when the open/close switch 34 is closed, packet signals from the mixer 6 can be supplied to the packet processing section 11 through a switch 36*b* on the mixer side. Accordingly, for example, the mixer 6 can perform mixing of a live performance, and the multimedia data recording/reproducing device 2 can simultaneously record mixing-processed data of the live performance.

In the first mode, as shown in FIG. 2 (*a*), the open/close switch 34 is opened, and packet signals from the packet processing section 11 are supplied to the mixer 6 through the switch 36*b* on the mixer side. The packet signals supplied from the packet processing section 11 are those that have been converted by delivery devices each corresponding to each of the types of data, such as, for example, the audio data delivery section 32. Accordingly, although the packet signals are actually delivered from the multimedia data recording/reproducing device 2, the multimedia data recording/reproducing device 2 can behave as if the packet signals were delivered from the stage unit 4 to the mixer 6. For example, an operator of the mixer 6 can perform rehearsal, adjustment and sound checking for mixing for a live performance at the mixer 6 though performers do not actually play the musical instruments. Similarly, by opening the switch 34 and supplying packet signals from the packet processing section 11 to the stage unit 4 through the switch 36*a* on the side of the stage unit 4, the multimedia data recording/reproducing device 2 can behave as if the packet signals were delivered from the mixer 6 to the stage unit 4, although the packet signals are actually sent from the multimedia data recording/reproducing device 2.

Figure 3:
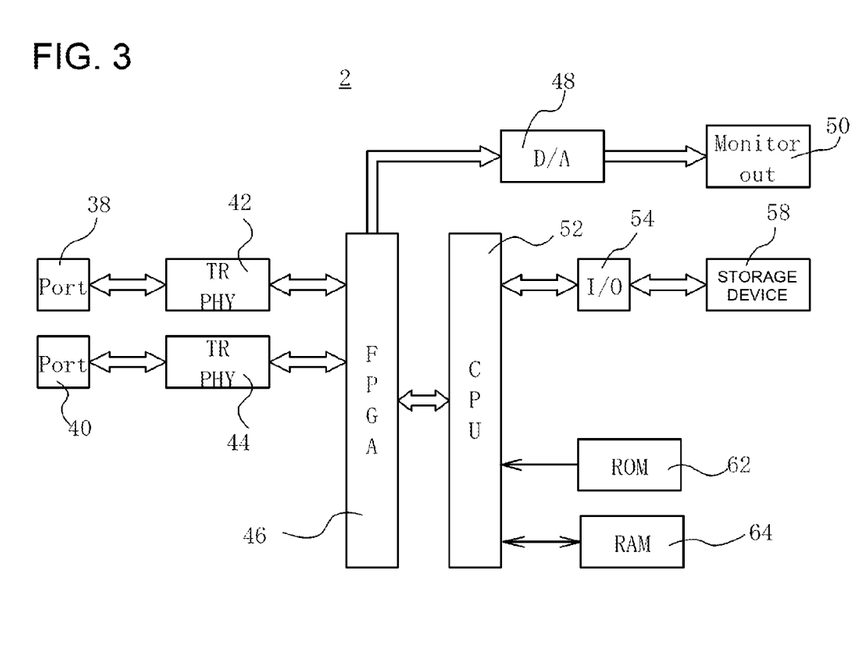
FIG. 3 is a further circuit block diagram of the multimedia data recording/reproducing device shown in FIG. 1.

FIG. 3 shows a circuit block diagram of the multimedia data recording/reproducing device 2 having ports 38 and 40 that are connected to the stage unit 4 and the mixer 6 through the sections of the transmission path 8. These ports are connected to a FPGA 46 through physical layer and transformer circuits 42 and 44, respectively. The FPGA 46 functions as the path switching control section 10 and the packet processing section 11 shown in FIG. 1. Also, a D/A converter 48 connected to the FPGA 46 and a monitor out port 50 function as the monitor section 22 shown in FIG. 1. The FPGA 46 is also connected to a CPU 52. The CPU 52 is configured to provide the recording section 14, the reproduction section 26 and the control section 18 shown in FIG. 1. The CPU 52 is connected to a storage device 58, through an input/output I/O unit 54, which together provide the storage section 20 shown in FIG. 1. A ROM 62 and a RAM 64 are connected to the CPU 52.

Figure 4:
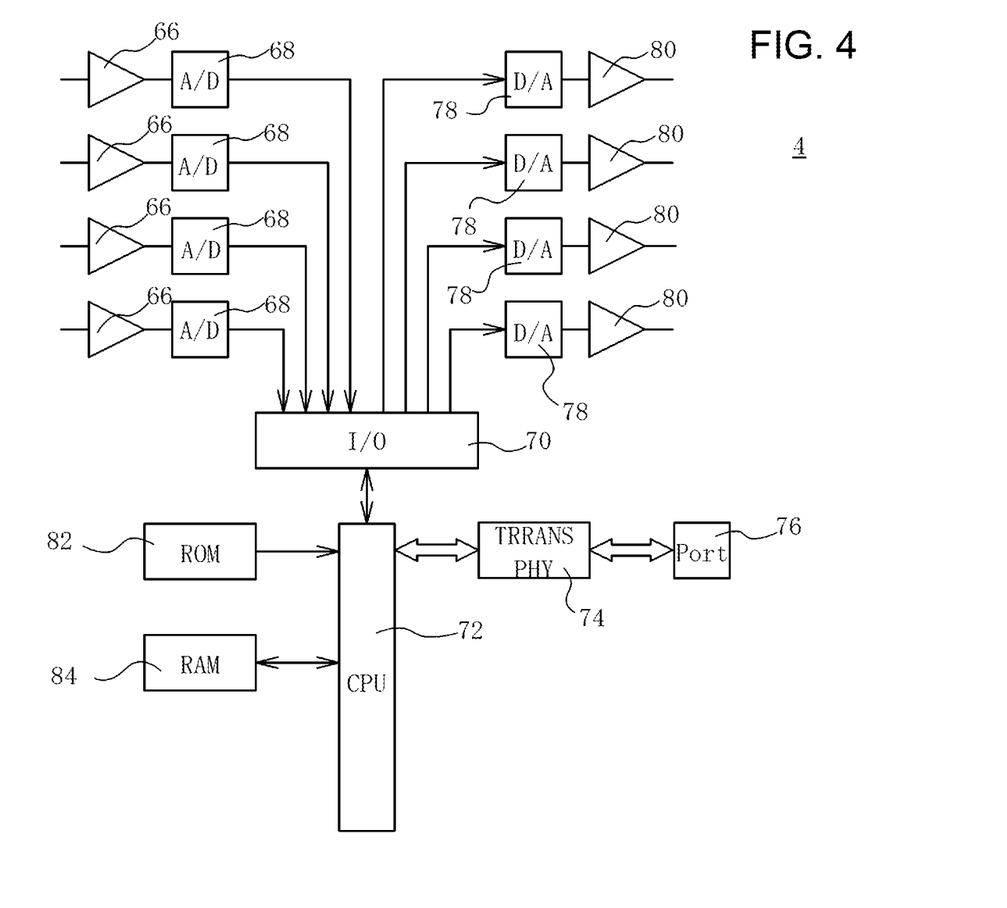
FIG. 4 is a circuit block diagram of a stage unit used together with the multimedia data recording/reproducing device shown in FIG. 1.

FIG. 4 shows a circuit block diagram of the stage unit 4 of FIG. 1. In FIG. 4, analog signals are supplied to multiple input ports, for example, but not limited to four input ports (not shown) and are inputted to respective amplifiers 66 and converted into audio data by A/D converters 68. The audio data is supplied to the CPU 72 through the I/O unit 70. The CPU 72 supplies packet signals, which are packetized audio data, to the port 76, through the physical layer and transformer circuit 74. As the port 76 is connected to the transmission path 8, the packet signals are supplied to the multimedia data recording/reproducing device 2 and the mixer 6. Also, packet signals supplied to the port 76 from the multimedia data recording/reproducing device 2 or the mixer 6 through the transmission path 8 are supplied through the physical layer and transformer circuit 74 to the CPU 72, where the packet signals are converted to the original audio data or mixing-processed data, converted to analog signals by the D/A converters 78, amplified by the amplifiers 80, and supplied to respective output ports (not shown). A ROM 82 and a RAM 84 are connected to the CPU 72.

Figure 5:
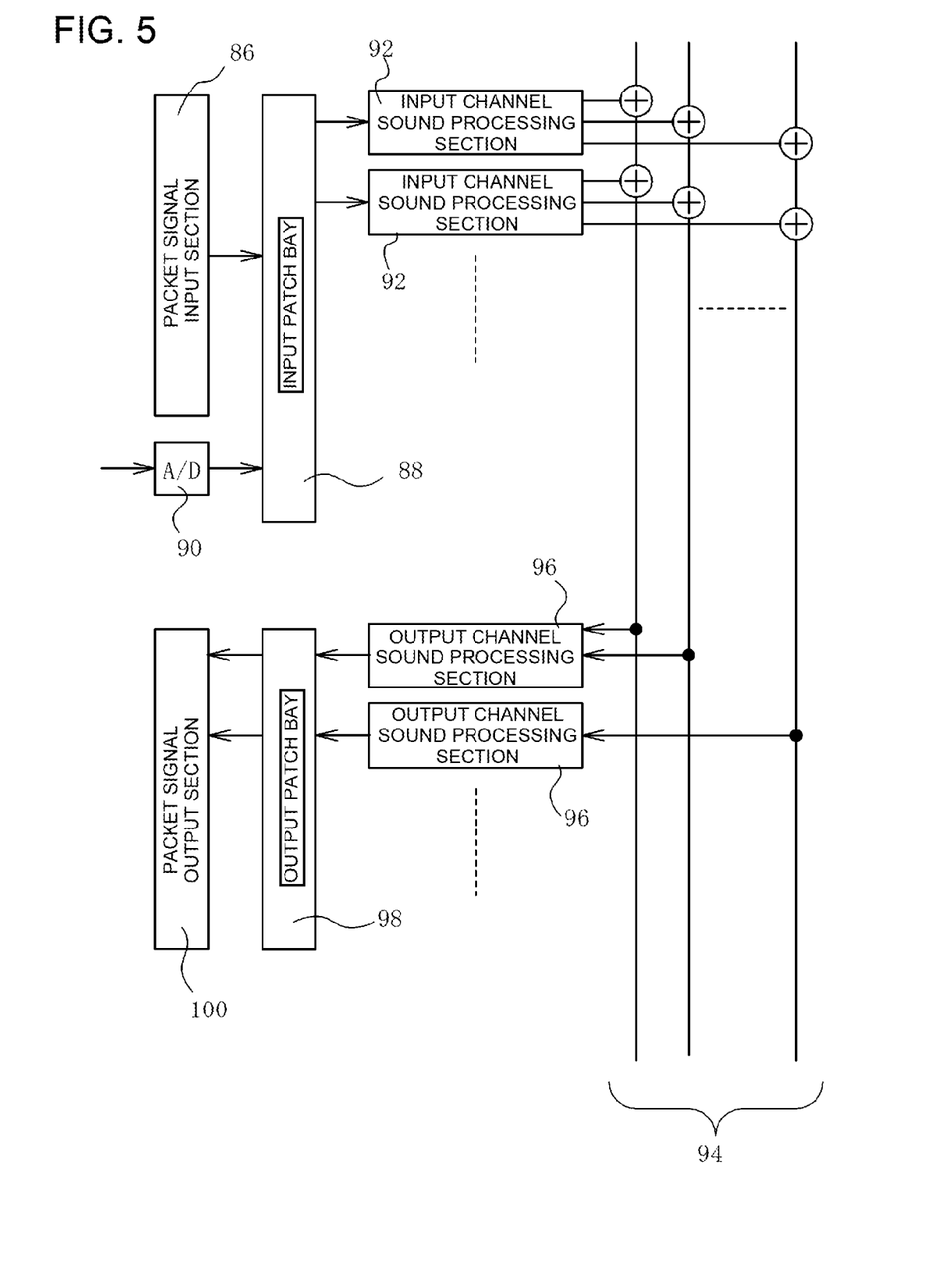
FIG. 5 is a circuit block diagram of a mixer used together with the multimedia data recording/reproducing device shown in FIG. 1.

FIG. 5 is a functional block diagram of the mixer 6 of FIG. 1. In FIG. 6, packet signals from the multimedia data recording/reproducing device 2 and/or the stage unit 4 are inputted into a packet signal input section 86, through ports (not shown), converted to audio data, and supplied to an input patch bay 88. Audio data converted by the A/D converter 90 from audio signals inputted in the mixer 6 may also be supplied to the input patch bay 88. The audio data is supplied by the input patch bay 88 to respective input channel sound processing sections 92, where sound processings, such as, but not limited to, fader, pan, equalizer, limiter, compressor processings or the like, are rendered. The processed sound audio data is supplied through a bus 94 to respective output channel sound processing sections 96 where equalizer, display and other processings are rendered, and then supplied to an output patch bay 98. Output signals of the output channel sound processing section 96 selected by the output patch bay 98 are supplied to a packet signal output section 100, converted to packet signals, and supplied to the multimedia data recording/reproducing device 2 and the stage unit 4 through ports (not shown) and the transmission paths 8.

In the embodiments described above, audio data is describe as an example of a type of multimedia data. However, in further embodiments, other suitable media data may be employed including, without limitation, video data, and both video data and audio data. For example, embodiments for transmitting and receiving video data may employ an I/O unit capable of transmission and reception of packet signals of video data and audio data from a video camera, and a video switcher, a video mixer, an AV mixer, a visual synthesizer and the like may be employed, instead of the mixer 6.

Also, in the first mode, rehearsal, adjustment and sound check for mixing for a live performance can be performed at the mixer 6. In particular, by closing the open/close switch 34 and sending selected channel signals of the stage unit 4 to the mixer 6, the device may be used like a karaoke machine.

The invention has been described above based on example embodiments. However, the invention need not be limited in any particular manner to the embodiments described above, and various improvements and changes can be made without departing from the subject matter of the invention.

The invention claimed is:

1. A multimedia data recording/reproducing device configured to be connected with at least one further device through a transmission path for communication of packetized multimedia data containing one or both of digital sound and video data, the multimedia data recording/reproducing device comprising:
   a capturing device that captures the packetized multimedia data, converts the packetized multimedia data to original multimedia data and outputs the same;
   a storage device that stores, reads and outputs the multimedia data outputted from the capturing device;
   a delivery device that packetizes the multimedia data outputted from the storage device and transmits the same to the transmission path; and
   a switching control device that controls a connection state among the at least one further device connected through the transmission path, the capturing device and the delivery device;
   wherein the at least one further device includes a first device having transmission and reception functions and a second device having transmission and reception functions connected to the transmission path, and wherein:
      in a first mode, the switching control device performs a control such that the first device and the second device are not connected with each other, and the delivering device and the second device are connected to each other; and
      in a second mode, the switching control device performs a control such that the first device and the second device are connected with each other, and the first device and the capturing device are connected to each other.

2. The multimedia data recording/reproducing device of claim 1, wherein the multimedia data is composed of multiple channels, and the storage device stores multimedia data of selected ones of the multiple channels.

3. The multimedia data recording/reproducing device of claim 2, wherein selection of the multiple channels is performed by using an input patch bay.

4. The multimedia data recording/reproducing device of claim 1, wherein the multimedia data is composed of multiple channels, and the storage device stores multimedia data of selected ones of the multiple channels.

5. The multimedia data recording/reproducing device of claim 4, wherein selection of the multiple channels is performed by using an input patch bay.

6. The multimedia data recording/reproducing device of claim 1, further comprising a monitoring device, wherein the multimedia data is composed of multiple channels, and the monitoring device outputs multimedia data of selected channels for monitoring, the selected channels being selected from among multimedia data outputted from the capturing device and multimedia data outputted from the storage device.

7. The multimedia data recording/reproducing device of claim 1, further comprising a control data capturing device and a recording and reproducing control device, wherein:
   the packet multimedia data includes packetized control data for controlling the storage device,
   the control data capturing device is configured to capture the packet multimedia data, convert the packet control data to the control data and output the same, and
   the recording and reproducing control device is configured to control the storage device based on the control data outputted from the control data capturing device.

8. The multimedia data recording/reproducing device of claim 7, wherein the multimedia data is composed of multiple channels, and the storage device stores selected ones of the multiple channels of the multimedia data, where the selected ones of the multiple channels are selected by the recording and reproducing control device.

9. The multimedia data recording/reproducing device of claim 7, further comprising a monitoring device, wherein the multimedia data is composed of multiple channels, and the monitoring device outputs selected ones of the multiple channels of the multimedia data, where the selected ones of the multiple channels are selected for monitoring by the recording and reproducing control device from among multimedia data outputted from the capturing device and multimedia data outputted from the storage device.

10. The multimedia data recording/reproducing device of claim 1, further comprising a monitoring device, wherein the multimedia data is composed of multiple channels, and the monitoring device outputs multimedia data of selected channels for monitoring, the selected channels being selected from among multimedia data outputted from the capturing device and multimedia data outputted from the storage device.

11. The multimedia data recording/reproducing device of claim 1, further comprising a control data capturing device and a recording and reproducing control device, wherein:
   the packetized multimedia data includes packetized control data for controlling the storage device,
   the control data capturing device is configured to capture the packet multimedia data, convert the packet control data to the control data and output the same, and
   the recording and reproducing control device is configured to control the storage device based on the control data outputted from the control data capturing device.

12. The multimedia data recording/reproducing device of claim 11, wherein the multimedia data is composed of multiple channels, and the storage device stores selected ones of the multiple channels of the multimedia data, where the selected ones of the multiple channels are selected by the recording and reproducing control device.

13. The multimedia data recording/reproducing device of claim 11, further comprising a monitoring device, wherein the multimedia data is composed of multiple channels, and the monitoring device outputs selected ones of the multiple channels of the multimedia data, where the selected ones of the multiple channels are selected for monitoring by the recording and reproducing control device from among multimedia data outputted from the capturing device and multimedia data outputted from the storage device.

14. In a multimedia data recording/reproducing device configured to be connected with at least one further device through a transmission path for communication of packetized multimedia data containing one or both of digital sound and video data, a method of operating the multimedia data recording/reproducing device comprising:

capturing the packetized multimedia data and converting the packetized multimedia data to original multimedia data with a data capturing device;

storing, with a data storage device, the original multimedia data from the data capturing device,     reading out from the data storage device the original multimedia data;

packetizing the multimedia data read out from the storage device and providing, with a delivery device, the packetized multimedia data to the transmission path; and controlling a switching control device to selectively change a connection state among the at least one further device connected through the transmission path, the data capturing device and the delivery device;

wherein the at least one further device includes a first device having transmission and reception functions and a second device having transmission and reception functions connected to the transmission path, and wherein controlling a switching control device comprises:

providing the switching control device with a first mode in which the first device and the second device are not connected with each other, and the delivering device and the second device are connected to each other; and         providing the switching control device with a second mode in which the first device and the second device are connected with each other, and the first device and the capturing device are connected to each other.

15. The method of claim 14, wherein the multimedia data is composed of multiple channels, and wherein storing comprises storing multimedia data of selected ones of the multiple channels in the storage device.

16. The method of claim 15, wherein storing multimedia data of selected ones of the multiple channels comprises selecting the selected ones of the multiple channels by using an input patch bay.

17. The method of claim 14, wherein the multimedia data is composed of multiple channels, and the method further comprises monitoring, with a monitoring device, multimedia data of selected channels, the selected channels being selected from among multimedia data outputted from the capturing device and multimedia data outputted from the storage device.

\* \* \* \* \*